(12) United States Patent
Manos et al.

(10) Patent No.: US 11,268,292 B2
(45) Date of Patent: *Mar. 8, 2022

(54) POST INSTALLATION BRACKET

(71) Applicant: MGL Partners, Senatobia, MS (US)

(72) Inventors: Robert Manos, Senatobia, MS (US); Scott Gray, Coldwater, MS (US)

(73) Assignee: MGL Partners, Senatobia, MS (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/807,295

(22) Filed: Mar. 3, 2020

(65) Prior Publication Data

US 2020/0199904 A1 Jun. 25, 2020

Related U.S. Application Data

(63) Continuation of application No. 16/158,507, filed on Oct. 12, 2018, now Pat. No. 10,590,672.

(Continued)

(51) Int. Cl.
*E04H 12/22* (2006.01)
*E04H 1/12* (2006.01)
(Continued)

(52) U.S. Cl.
CPC ....... *E04H 12/2284* (2013.01); *E04B 1/2604* (2013.01); *E04H 12/04* (2013.01);
(Continued)

(58) Field of Classification Search
CPC ..... E04H 6/025; E04H 12/22; E04H 12/2253; E04H 12/2261; E04H 12/2284;
(Continued)

(56) References Cited

U.S. PATENT DOCUMENTS 1,846,650 A ‡ 2/1932 Olson ................ E04F 11/1812
52/295
2,881,876 A * 4/1959 Williams .............. E04H 1/1266
52/126.4
(Continued)

FOREIGN PATENT DOCUMENTS

DE 2725057 A1 * 12/1978 ......... E04H 12/2284
DE 4330765 A1 * 3/1994 ............... E02D 5/54
(Continued)

OTHER PUBLICATIONS

International Searching Authority—United States Patent and Trademark Office, "International Search Report and Written Opinion," issue in connection with International Patent Application No. PCT/US18/55959, dated Jan. 7, 2019 (2 pgs).‡

*Primary Examiner* — Ryan D Kwiecinski
(74) *Attorney, Agent, or Firm* — Holland & Hart LLP

(57) ABSTRACT

A post installation bracket for installing posts on a base such as a concrete slab is provided. The post installation bracket includes a leveling plate with at least one leveling element and an anchoring bolt securing assembly configured to securely receive a first end of an anchoring bolt, a second end of the anchoring bolt distal to the first end securely anchored into the base. The post installation bracket further includes at least one leveling bolt securely fastened to each of the at least one leveling elements, the at least one leveling bolt used to position the leveling plate and post with respect to the base.

18 Claims, 9 Drawing Sheets

Related U.S. Application Data

(60) Provisional application No. 62/572,032, filed on Oct. 13, 2017.

(51) Int. Cl.
  *E04B 1/26* (2006.01)
  *E04H 12/04* (2006.01)

(52) U.S. Cl.
  CPC .... *E04H 12/2253* (2013.01); *E04B 2001/268* (2013.01); *E04B 2001/2684* (2013.01); *E04H 1/1205* (2013.01)

(58) Field of Classification Search
  CPC ....... E04B 2001/268; E04B 2001/2684; E04B 2001/2463; F16B 5/0233; F16B 13/063; F16B 13/065
  See application file for complete search history.

(56) References Cited

U.S. PATENT DOCUMENTS

| | | | | |
|---|---|---|---|---|
| 3,999,353 | A * | 12/1976 | Dielman | E04F 11/1814 52/835 |
| 6,141,928 | A * | 11/2000 | Platt | E04F 11/1812 52/296 |
| 6,948,283 | B2 ‡ | 9/2005 | Burkart | B29C 33/005 248/34 |
| 7,475,479 | B1 * | 1/2009 | Ross | E04F 11/1812 29/525.01 |
| 7,533,506 | B2 * | 5/2009 | Platt | E04H 12/2261 52/296 |
| 7,677,522 | B2 * | 3/2010 | Bakos | E04H 12/2261 248/500 |
| 8,281,531 | B2 ‡ | 10/2012 | Dent | E02D 27/32 403/13 |
| 8,336,267 | B2 * | 12/2012 | Montague | E04B 1/4157 52/295 |
| 8,622,364 | B2 * | 1/2014 | Bergman | E04H 12/2261 248/523 |
| 8,959,857 | B1 * | 2/2015 | Lin | E04H 12/2261 52/296 |
| 9,382,722 | B2 * | 7/2016 | Banyi | E04H 12/2292 |
| 9,976,298 | B2 * | 5/2018 | Bergman | E04F 11/1812 |
| 10,378,232 | B2 * | 8/2019 | Volin | E04H 12/2215 |
| 10,422,150 | B2 * | 9/2019 | Roy | E04H 12/2284 |
| 2006/0022188 | A1 ‡ | 2/2006 | Collins | E04H 12/2261 256/65 |
| 2007/0158526 | A1 * | 7/2007 | Platt | E04H 12/2261 248/519 |
| 2007/0267552 | A1 ‡ | 11/2007 | Meyer | E04H 12/2261 248/15 |
| 2008/0184633 | A1 ‡ | 8/2008 | Hamilton | E04H 12/2261 52/127 |
| 2016/0047137 | A1 * | 2/2016 | Aagerup | E02D 27/42 248/530 |
| 2017/0175384 | A1 * | 6/2017 | Bergman | E04F 11/1812 |
| 2017/0335590 | A1 * | 11/2017 | Volin | E04H 12/2215 |
| 2018/0251996 | A1 * | 9/2018 | Roy | E02D 27/42 |
| 2018/0283011 | A1 * | 10/2018 | Pilja | E04F 11/1812 |
| 2020/0340649 | A1 * | 10/2020 | Oliver | F21V 21/02 |

FOREIGN PATENT DOCUMENTS

| | | | | |
|---|---|---|---|---|
| DE | 19506153 | A1 * | 7/1995 | ......... E04H 12/2284 |
| DE | 29606117 | U1 * | 8/1996 | ......... E04H 12/2253 |
| DE | 102011121878 | A1 * | 6/2013 | ............ E02D 27/42 |
| DE | 202018103518 | U1 * | 7/2018 | ......... E04H 12/2261 |
| EP | 1114904 | A1 * | 7/2001 | ......... E04H 12/2261 |
| GB | 2417500 | A * | 3/2006 | ......... E04H 12/2284 |
| GB | 2460271 | A * | 11/2009 | ......... E04H 12/2284 |
| WO | WO-03021045 | A1 * | 3/2003 | ............. E01F 9/635 |
| WO | WO-2010047608 | A1 * | 4/2010 | ............ E02D 27/42 |
| WO | WO-2016200268 | A1 * | 12/2016 | ......... E04H 12/2261 |

* cited by examiner
‡ imported from a related application

POST INSTALLATION BRACKET

CROSS-REFERENCES

The present Application for Patent claims the benefit of U.S. Non-Provisional patent application Ser. No. 16/158,507 by Manos et al., entitled "POST INSTALLATION BRACKET," filed Oct. 12, 2018 and U.S. Provisional Patent Application No. 62/572,032 by Manos et al., entitled "POST INSTALLATION BRACKET," filed Oct. 13, 2017, which are expressly incorporated herein by reference.

BACKGROUND

Posts, such as wooden posts, are utilized to support carports, pergolas, decks, overhangs, etc. These posts may be installed on a structural base (e.g., a concrete slab) using brackets that incorporate a sleeve system. The sleeve-based brackets may not be able to withstand significant forces applied to the post and may cause cracks or splits in a post when a force is applied.

SUMMARY

A post installation bracket includes a leveling plate with at least one leveling element and an anchoring bolt securing assembly configured to securely receive a first end of an anchoring bolt, a second end of the anchoring bolt distal to the first end securely anchored into concrete. The post installation bracket further includes at least one leveling bolt securely fastened to each of the at least one leveling elements. The at least one leveling bolt used to position the leveling plate with respect to the concrete.

This Summary is provided to introduce a selection of concepts in a simplified form that are further described in the Detailed Description. This Summary is not intended to identify key features or essential features of the claimed subject matter, nor is it intended to be used to limit the scope of the claimed subject matter. Other features, details, utilities, and advantages of the claimed subject matter will be apparent from the following more particular written Detailed Description of various implementations and implementations as further illustrated in the accompanying drawings and defined in the appended claims.

BRIEF DESCRIPTIONS OF THE DRAWINGS

DETAILED DESCRIPTION OF THE DRAWINGS

Posts, such as wooden posts, are utilized to support carports, pergolas, decks, overhangs, etc. These posts may be installed on a structural base (e.g., a concrete slab with a footing) using brackets that incorporate a sleeve system. The sleeve-based brackets may not be able to withstand significant forces applied to the post and may cause cracks or splits in a post when a force is applied. Implementations described herein provide a post installation bracket that may be used to install a post, such as a wooden post, on an anchored bolt (e.g., a concrete anchor) and to level the post into a desired position (e.g., substantially perpendicular to the base).

The post installation bracket includes a leveling assembly with leveling elements. The leveling assembly is attached an end of the post before the post is installed on a concrete anchoring bolt. The leveling assembly includes components for securely receiving the anchoring bolt. When the post is installed on the concrete anchoring bolt, the leveling elements are utilized to level the post into a desired position. The post is securely attached to the anchoring bolt and the leveling elements tensionally secure the post. Accordingly, the post is securely attached to the concrete slab and is able to withstand significant forces. As such, the posts may be installed before any beams are installed. Furthermore, the bracket provides spacing between the end of the post and the concrete surface, which keeps moisture from rotting the post.

Figure 1:
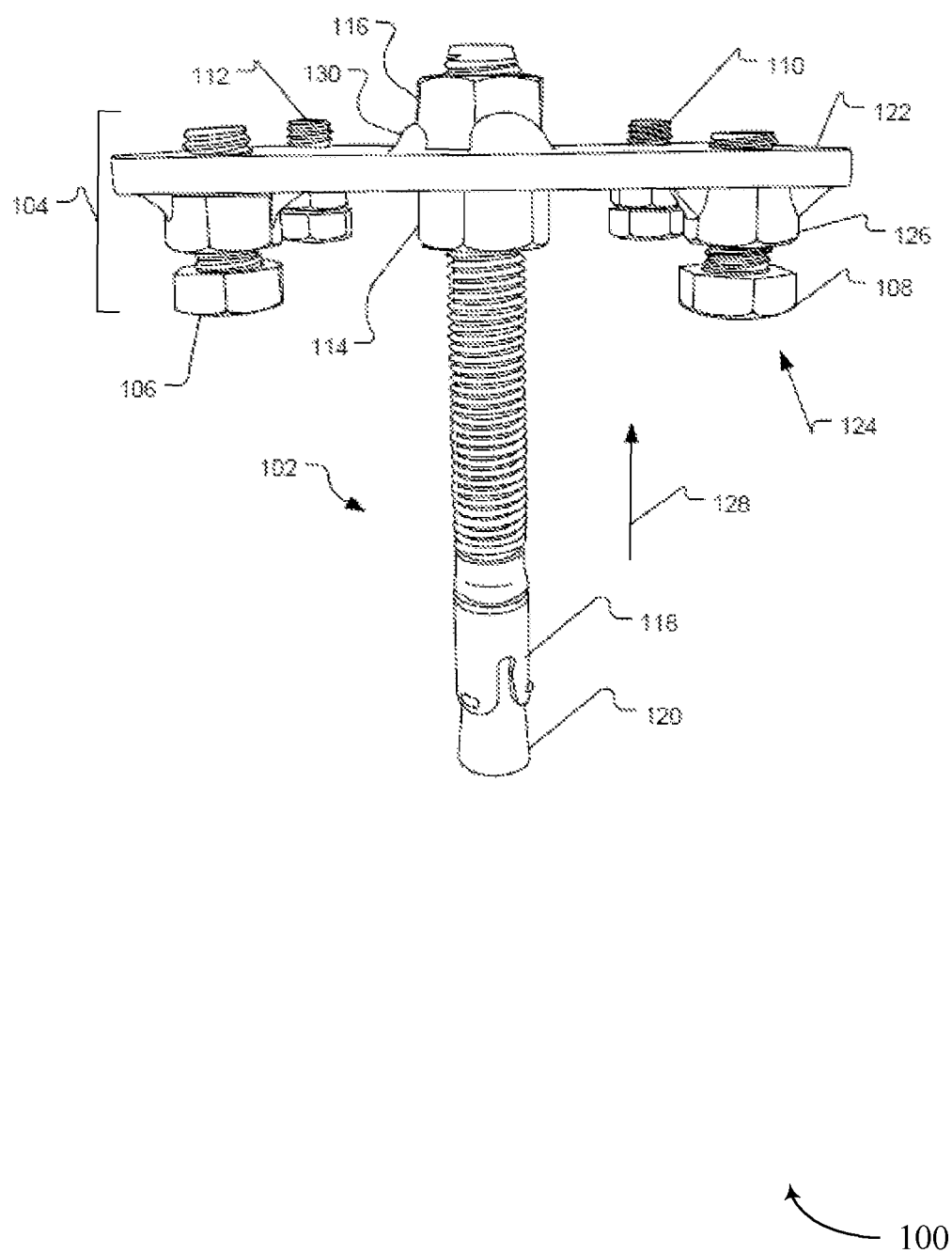
FIG. 1 illustrates a side perspective view of an example post installation bracket.

FIG. 1 illustrates a side perspective view of an example post installation bracket 100. The post installation bracket 100 includes an anchoring bolt 102 and a leveling assembly 104. The anchoring bolt 102 may be any type of concrete anchor such as wedge anchor or a sleeve anchor. In the illustrated implementation, the anchoring bolt 102 is a wedge anchor that includes an expander 118 and a wedge element 120. The anchoring bolt 102 is installed in a concrete slab (not shown) and is securely attached to a leveling plate 122 using anchoring nuts 114 and 116.

The leveling assembly 104 includes the leveling plate 122, leveling bolts 106, 108, 110, and 112, and the anchoring nuts 114 and 116. The leveling assembly 104 is configured to be securely attached to a post (not shown), such as a structural post. The post may be a post that holds up a part of a structure such as a post for a carport, pergola, deck, overhang, etc. It should be understood that the implementations described herein may be used with other types of posts, such as decorative posts. Before the leveling plate 122 is attached to a post, a pilot hole for the anchoring bolt 102 is drilled into the end of the post. The pilot hole is configured to receive and securely fasten to the anchoring bolt 102. The leveling plate is attached to the end of the post using fasteners (not shown), such as lag bolts or screws, inserted through pilot holes (not shown) of the leveling plate 122. The anchoring nut 116 is securely fastened to the leveling plate 122 using welds (e.g., a weld) and is configured to secure the post to the anchoring bolt 102 when the post is installed. In some example implementations, the leveling assembly 104 does not include the anchoring nut 116. Rather, a threaded column, hole, channel, etc. is formed as a part of the leveling plate 122. Thus, the anchoring nut 116 with the weld 130 (or another prefabricated configuration) may be referred to as an anchoring bolt securing element.

The leveling assembly 104 includes leveling elements (e.g., a leveling element 124). In the illustrated implementation, the leveling elements include a leveling bolt and a nut. For example, the leveling element 124 includes the leveling bolt 108 and a nut 126. The nut 126 is securely welded or otherwise attached to the leveling plate 122. In some example implementations, a threaded column, hole, channel, etc. is formed as a part of the leveling plate 122 (similar to the anchoring nut 116) and is configured to securely receive the leveling bolts (such as the leveling bolt 108). The leveling bolts 106, 108, 110, and 112 are utilized to level and position the post after the post is installed on the anchoring bolt 102. As such, the leveling bolts 106 are accessible to level the post while the leveling plate 122 is attached to a post and the post is installed on the anchoring bolt 102, The leveling plate 122 may be formed of a carbon steel plate, stainless steel, or other type of metal. The various nuts and bolts may be stainless steel, zinc coated steel, etc. In some example implementations, the leveling plate 122 is formed of a carbon steel plate and the bolts are formed of stainless steel for rust prevention.

To utilize the post installation bracket 100, the anchoring bolt 102 is installed/anchored in a concrete slab. To install the anchoring bolt 102 into a concrete slab, a hole is drilled into the concrete slab. In some example implementations, the concrete slab includes a footing with a minimum depth of 10 inches. The size of the hole is dependent on the size of the anchoring bolt. After the hole is drilled into the concrete, the anchoring bolt 102 is placed in the hole and positioned (e.g., hammered) into place. The anchoring nut 114 is then placed on the anchoring bolt and tightened into place. In some example implementations, a washer is positioned between the anchoring nut 114 and the top surface of the concrete slab. The anchoring nut 114 is tightened such that the nut impacts the top surface of the concrete slab (or the washer). The anchoring nut 114 is further tightened such as to draw the anchoring bolt body upward (e.g., in a direction illustrated by an arrow 128). As the body is of the anchoring bolt 102 is pulled upward, the wedge element 120 is drawn upward and expands the expander 118, which frictionally fastens to the interior walls of the hole in the concrete, thus securely attaching the anchoring bolt 102 to the concrete slab. It should be understood that the anchoring bolt may be otherwise securely fastened to a base (e.g., a concrete slab). For example, a bolt may be positioned in the concrete slab while the slab is being cured. In other cases, the bolt is attached to a base using a bracket. In some cases, the base may be a metal beam, and the anchoring bolt is securely fastened to the beam (e.g., welded, bracketed, machined as part of the beam).

A pilot hole, bore, column, etc. is drilled into the post to receive the anchoring bolt, and, in some cases, a wider recessed portion is drilled in the post to receive the anchoring nut 116. The leveling assembly 104 (including the leveling elements) is attached to the end of the post and positioned such that the anchoring nut 116 (which is welded to the leveling plate 122) is received in the recessed portion and is positioned near the pilot hole. The leveling assembly 104 is attached to the end of the post using fasteners such as lag bolts or screws inserted through pilot holes (not shown) of the leveling plate 122. In some example implementations, pilot holes are drilled in the end of the post for receiving the fasteners. The post with the leveling assembly 104 attached is then lowered onto the anchoring bolt 102 and rotated until leveling elements contact the concrete surface and the leveling plate 122 contacts the anchoring nut 114. The bolts of the leveling elements (e.g., the bolt 108 of the leveling element 124) are then rotated to level the post into the desired positioned. The leveling elements also tensionally support the post (e.g., the leveling bolts 106 and 108 provide upward force to the post to support the post). The bottom of the post may then be framed to hide the leveling elements and/or the leveling plate 122.

In some example implementations, the leveling assembly 104 is formed as a part of a post. For example, a steel post may be formed with an end plate configured as the leveling assembly 104. As such, the steel post may be installed on a concrete anchor attached to a concrete slab then positioned into place using leveling elements on the leveling assembly formed as a port of the steel post. Similarly, a leveling assembly 104 may be welded to an end of a steel post. In some cases, the post installation bracket is covered by the bottom of the post, such that the bracket is hidden from most views and can be easily framed and covered (e.g., elements do not extend past the side walls of the post).

The post installation bracket disclosed herein is described with respect to a vertically positioned post attached to a concrete slab. However, it should be understood that the bracket may be utilized to install a laterally positioned beam. For example, a lag bolt may extend horizontally from a structural post, beam, or concrete wall. Another beam with the leveling assembly 104 attached to an end may be positioned on the horizontally extending lag bolt and rotated into place. The leveling elements may be utilized to position the lateral beam into a desired position (e.g., substantially perpendicular to a wall or substantially parallel to a floor). Similarly, the implementations described herein may be utilized with a bolt other than a concrete anchoring bolt.

For a 6×6 inch post, the anchoring bolt 102 is a ¾-inch (diameter) concrete anchoring bolt and the leveling bolts are ½ inch (diameter) bolts. For an 8×8 inch or 10×10 inch post, the anchoring bolt 102 is a 1 inch (diameter) concrete anchoring bolt and the leveling bolts are ⅝ inches. The anchoring bolts may be up to 10 inches in length, for example. It should be understood that other dimensions of anchoring bolts and leveling bolts may be utilized.

Figure 2:
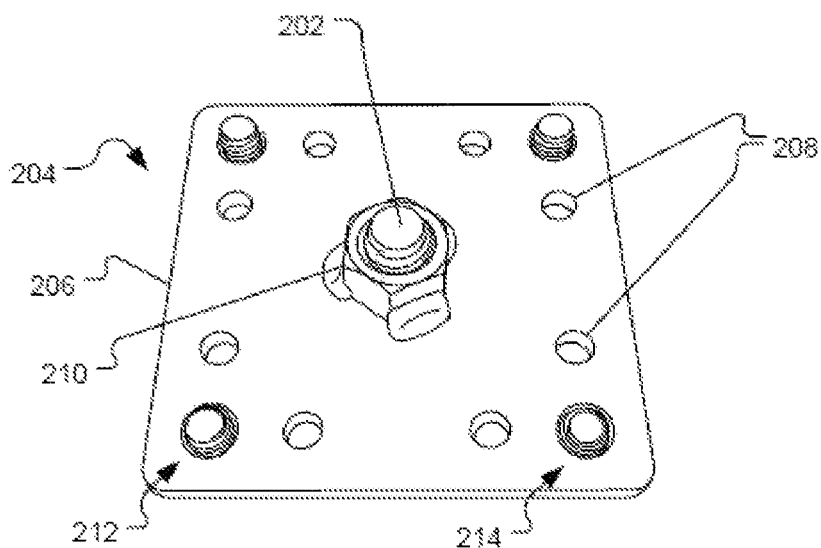
FIG. 2 illustrates an elevated perspective view of an example post installation bracket.

FIG. 2 illustrates an elevated perspective view of an example post installation bracket 200. The post installation bracket includes an anchoring bolt 202 and a leveling assembly 204. The leveling assembly 204 includes a leveling plate 206, a plurality of pilot holes (e.g., pilot holes 208), an anchoring nut 210, and a number of leveling elements (e.g., leveling elements 212 and 214). The anchoring nut 210 is securely attached to the leveling plate 206. In the illustrated implementation, the anchoring nut 210 is welded to the leveling plate 206, but it should be understood that other configurations are contemplated. For example, an anchoring bolt channel may be machined as a part of the leveling plate and configured to securely receive the anchoring bolt 202. The pilot holes (e.g., the pilot holes 208) are utilized to securely attach the leveling plate 206 to an end of a post (not shown) using fasteners such as lag bolts. For example, lag bolts are inserted through the pilot holes and rotated to securely attached the leveling plate 206 to the post.

Pilot holes are also positioned and configured for the leveling elements 212. In the illustrated implementation, the leveling elements include a bolt inserted through a pilot hole. The pilot holes may be threaded such as to receive the leveling elements. In some implementations, threaded nuts are welded (or otherwise securely attached) to the rear side (not shown) of the leveling plate such as to receive the leveling bolts. In some implementations, leveling bolt channels are machined as a part of the leveling plate 206.

Figure 3:
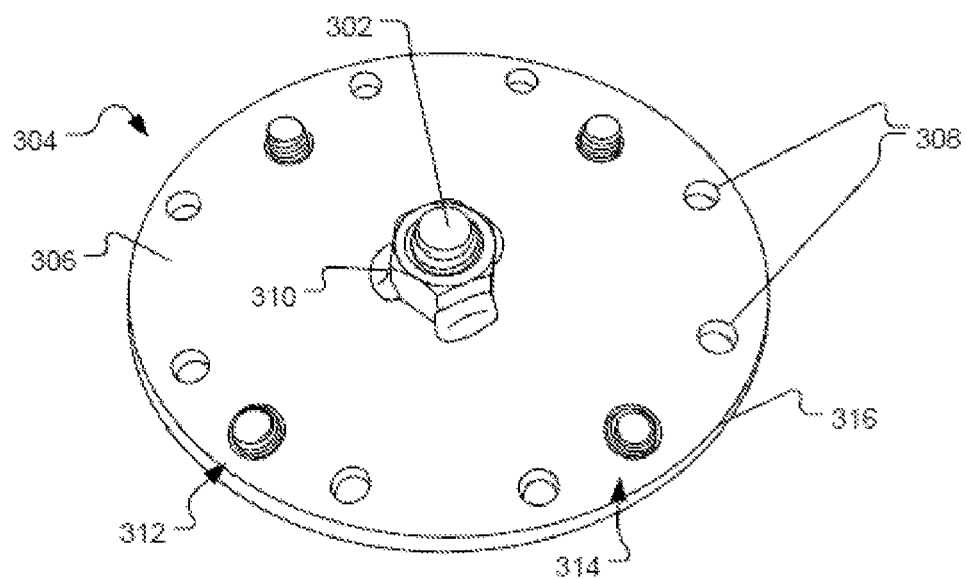
FIG. 3 illustrates another elevated perspective view of an example post installation bracket.

FIG. 3 illustrates another elevated perspective view of an example post installation bracket 300. The post installation bracket includes an anchoring bolt 302 and a leveling assembly 304. The leveling assembly 304 includes a leveling plate 306, a plurality of pilot holes (e.g., pilot holes 308), an anchoring nut 310, and a number of leveling elements (e.g., leveling elements 312 and 314). In FIG. 3 the leveling plate 306 is circularly shaped and may be used for a cylindrically shaped post, such as a wooden post. It should be understood that the leveling plate 306 may be configured in a number of different shapes. The anchoring nut 310 is securely attached to the leveling plate 306. In the illustrated implementation, the anchoring nut 310 is welded to the leveling plate 306, but it should be understood that other configurations are contemplated. For example, an anchoring bolt channel may be machined as a part of the leveling plate and configured to securely receive the anchoring bolt 302. The pilot holes (e.g., the pilot holes 308) are for securely attaching the leveling plate 306 to an end of a post (not shown) using fasteners such as lag bolts. For example, lag bolts are inserted through the pilot holes and rotated to securely attached the leveling plate 306 to the post. In some example implementations, wooden posts (or other types of posts) are hollow, and thus the pilot holes 308 are positioned towards an outer edge 316 of the leveling plate 306. However, it should be understood that the pilot holes 308 may be positioned more toward the center of the leveling plate 306.

Pilot holes are also positioned and configured for the leveling elements 312. In the illustrated implementation, the leveling elements include a bolt inserted through a pilot hole. The pilot holes may be threaded such as to receive the leveling elements. In some implementations, nuts are welded (or otherwise securely attached) to the rear side (not shown) of the leveling plate such as to receive the leveling bolts. In some implementations, threaded leveling bolt channels are machined as a part of the leveling plate 306 and configured to receive leveling bolts.

Figure 4:
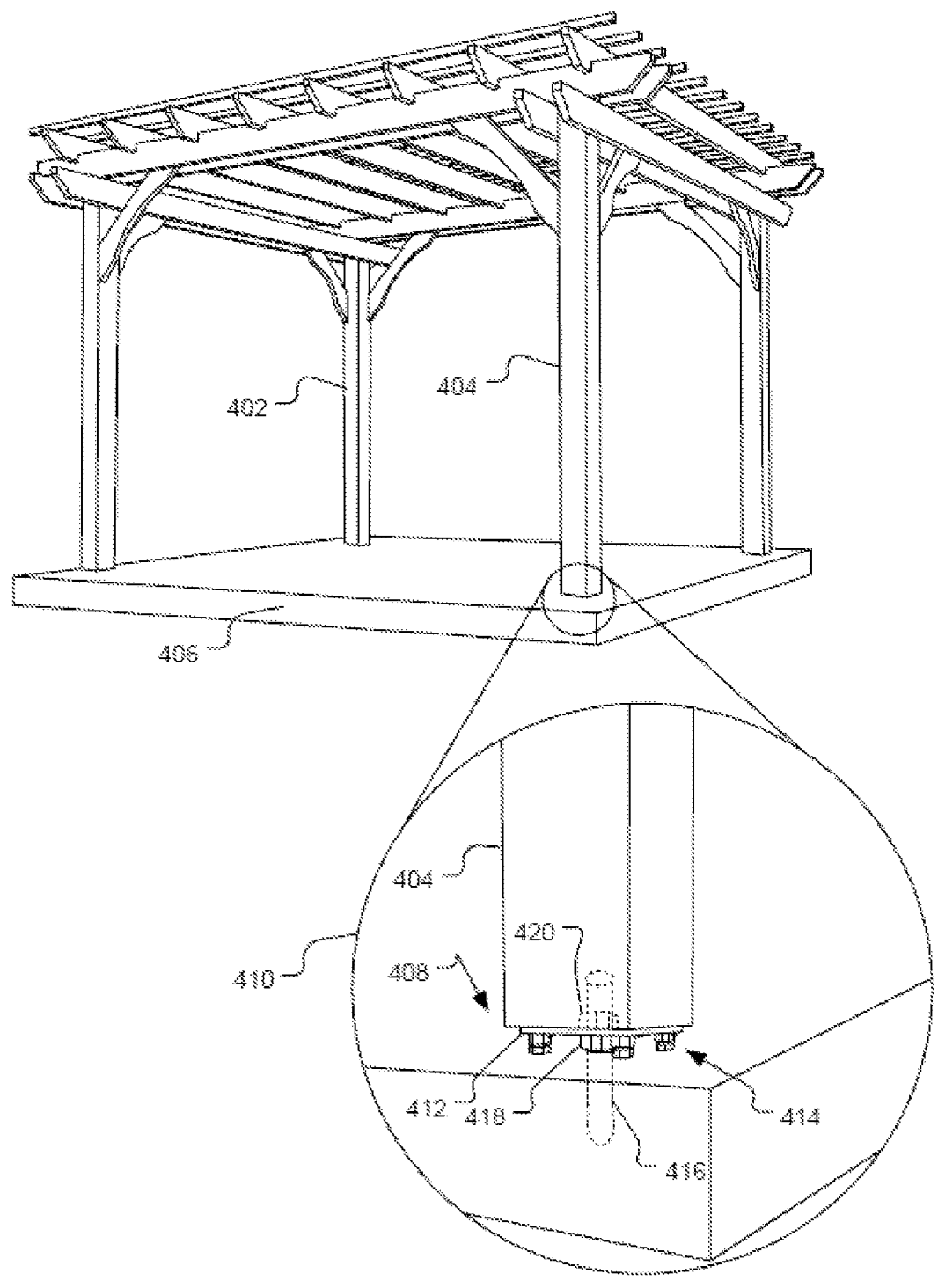
FIG. 4 illustrates an example pergola with posts installed using example post installation brackets described herein.

FIG. 4 illustrates an example pergola 400 with posts (e.g., posts 402 and 404) installed on a concrete slab 406 using example post installation brackets described herein. For example, post 404 is installed on the concrete slab using a post installation bracket 408 as illustrated in an expanded view 410. The post installation bracket 408 includes a leveling plate 412 attached to an end of the post 404. The leveling plate 412 includes leveling elements, such as a leveling element 414. An anchoring bolt 416 is partially illustrated (via dotted lines) and is anchored to the concrete slab 406 and extends into a pre-drilled pilot hole, bore, column, etc. in the post 404. The post 404 is frictionally attached to the anchoring bolt 416 with anchoring nuts 418 and 420. After the post 404 is installed onto the anchoring bolt 416, the leveling elements are used to level/position the post 404. For example, a bolt of the leveling element 414 is rotated, which causes the nut to extend (or contract) against the top surface of the concrete slab 406 and move the post 404 into a desired position, such as substantially perpendicular to the concrete. As such, the leveling elements (e.g., leveling element 414) are accessible while the post is installed on the bracket. Furthermore, the bolts may provide some upward forces from the base to the post such as to prove more resistance to lateral forces. Furthermore, because the bolts do not break or otherwise breach the interior of the post, the structural integrity of the post is not substantially disturbed.

In some cases, the leveling plate 412 may be positioned on and anchored to the base (e.g., the concrete slab 406) before the post 404 is installed. In such cases, the leveling plate may not be anchored (e.g., using screws) to the post 404. The post 404 may be rotated into position on the anchoring bolt 416, and the leveling elements 414 may be utilized to position the post 404 into a desired position and also provide upward forces to hold the post 404 into place. In such cases, even though the plate is not installed on the post before the post is installed, the level plate and leveling elements 414 are still accessible to level and secure the post. In this and other implementations, the leveling bolts may be directed up or down.

Figure 5:
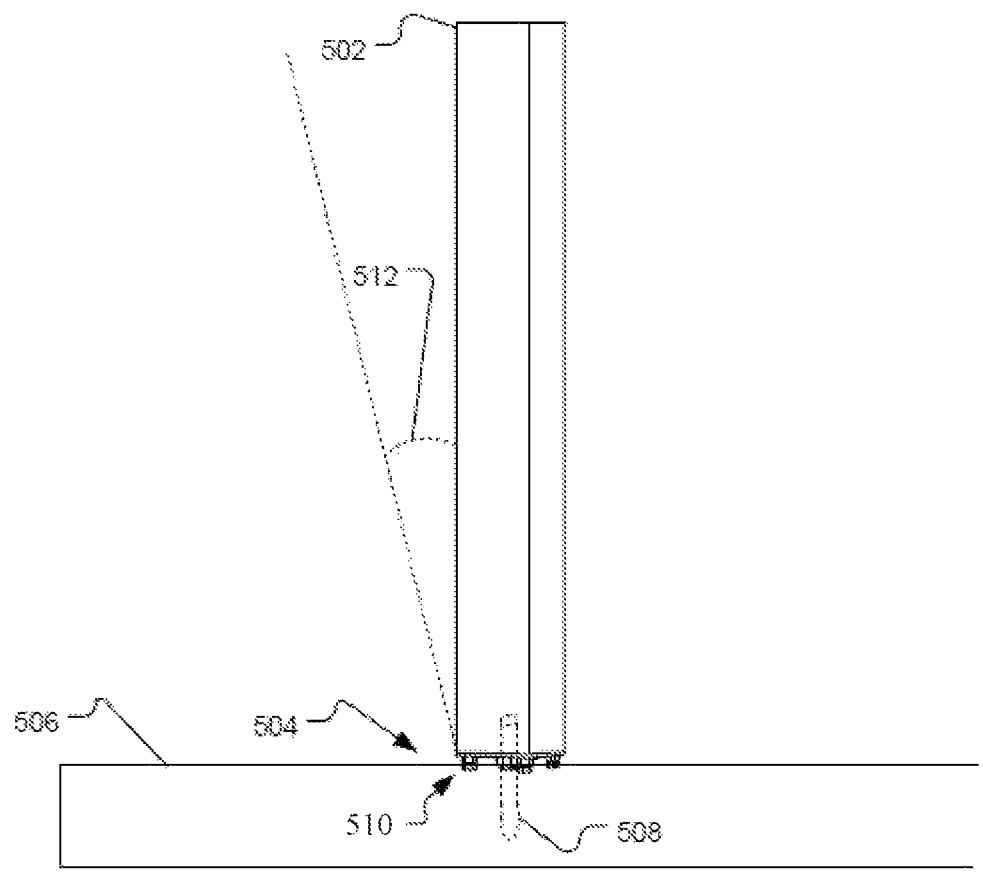
FIG. 5 illustrates an example post installed using an example post installation bracket.

FIG. 5 illustrates an example post 502 installed on a concrete slab 506 using an example post installation bracket 504. An anchoring bolt 508 is anchored to the concrete slab 506 and the post 502 using anchoring nuts. Leveling elements (e.g., a leveling element 510) are used to position and level the post 502. For example, the leveling element 510 is used to level the post 502. When initially installed, the post 502 may be skewed at an angle 512. A bolt of the leveling element 510 is rotated to extend the bolt towards the concrete, which lifts the post into a desired upright position (e.g., substantially 90 degrees from the concrete) and further tensionally secures the post in the desired position. For example, the bolts of the other leveling elements may be rotated and extended to tensionally secure the post 502. Because the leveling elements are utilized to level the post 502, the base (e.g., the concrete slab 506) does not have to be level. In other words, the post 502 may be installed on an unlevel surface, and the leveling elements may be used to level the post 502. Further, because the plate is installed on the post before the post is positioned on the anchoring bolt 508, an installer does not need to worry about leveling the post before the post is installed. Because posts, such as the post 502, may be heavy, posts are prone to skew or lean when installed. Thus, after installation, the post installation bracket described herein may be used to level the post.

Figure 6:
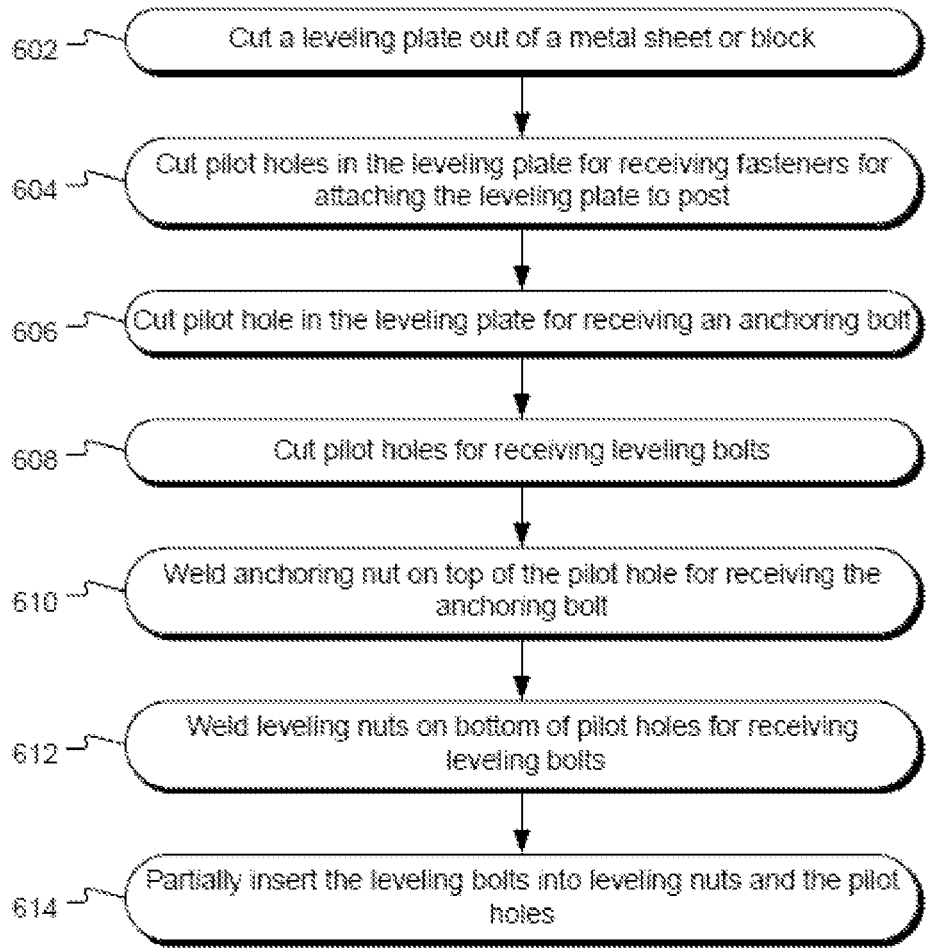
FIG. 6 illustrates example operations for manufacturing a leveling assembly of an example post installation bracket.

FIG. 6 illustrates example operations 600 for manufacturing a leveling assembly of an example post installation bracket. A cutting operation 602 cuts a leveling plate out of a sheet or block. A cutting operation 604 cuts pilot holes in the leveling plate for receiving fasteners for attaching the leveling plate to a post. A cutting operation 606 cuts pilot holes in the leveling plate for receiving an anchoring bolt. A cutting operation 608 cuts pilot holes for receiving leveling bolts. The cutting operations 602 to 608 may be performed automatically by a machine and may be performed via laser cutting, plasma cutting, drilling, punching, engraving, etc.

A welding operation 610 welds an anchoring nut on top of the pilot hole for receiving the anchoring bolt. A welding operation 612 welds leveling nuts on the bottom of the pilot holes for receiving leveling bolts. In some example implementations, instead of welding the nuts, threaded receiving channels are machined or formed as part of the leveling plates. An inserting operation 614 partially inserts the leveling bolts into the leveling nuts and the pilot holes. The leveling assembly is complete and may be attached to a post for installation on an anchoring bolt anchored into a concrete slab.

Figure 7:
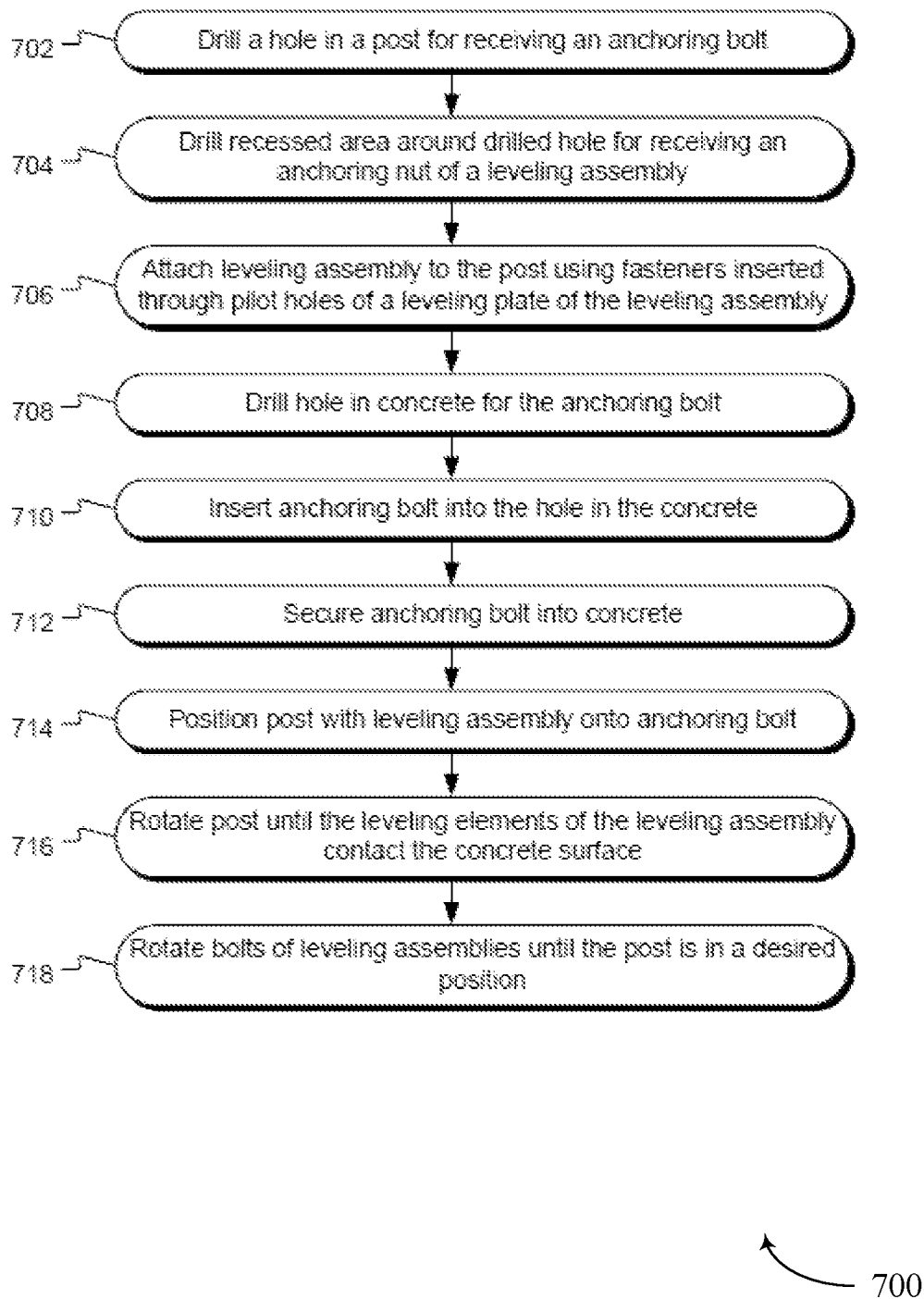
FIG. 7 illustrates example operations for utilizing a post installation bracket described herein.

FIG. 7 illustrates example operations 700 for utilizing a post installation bracket described herein. A drilling operation 702 drills a hole or bore in a post for receiving an anchoring bolt. In some cases, a drilling operation 704 drills a recessed area around the drilled hole for receiving an anchoring nut of a leveling assembly. An attaching operation 706 attaches the leveling assembly to the post using fasteners inserted though the pilot holes of a leveling plate of the leveling assembly. The fasteners may be bolts, screws, nails, staples, etc.

A drilling operation 708 drills a hole in a concrete slab for the anchoring bolt. An inserting operation 710 inserts the anchoring bolt into the hole in the concrete. A securing operation 712 secures the anchoring bolt into the concrete. The securing operation 712 may include tightening a nut down onto the anchoring bolt such that the anchoring bolt is drawn out and expands an expanding element into the sides of the concrete hole. In some cases, the anchoring bolt is otherwise attached to a base (e.g., setting the anchoring bolt in concrete, using a bracket, etc.)

A positioning operation 714 positions the post with the leveling assembly onto the anchoring bolt. A rotating operation 716 rotates the post until the leveling elements of the leveling assembly contact the concrete surface. The anchoring bolt may be received into an anchoring pilot hole and an anchoring nut of the leveling assembly. The anchoring bolt may extend into the hole drilled into the post. Another rotating operation 718 rotates the bolts of the leveling elements of the until the post ins in a desired positioned (e.g., 90 degrees with respect to the concrete slab). The rotating operation 718 further applies upward forces to the post such that the post is tensionally secured against lateral forces applied to the post.

Figure 8:
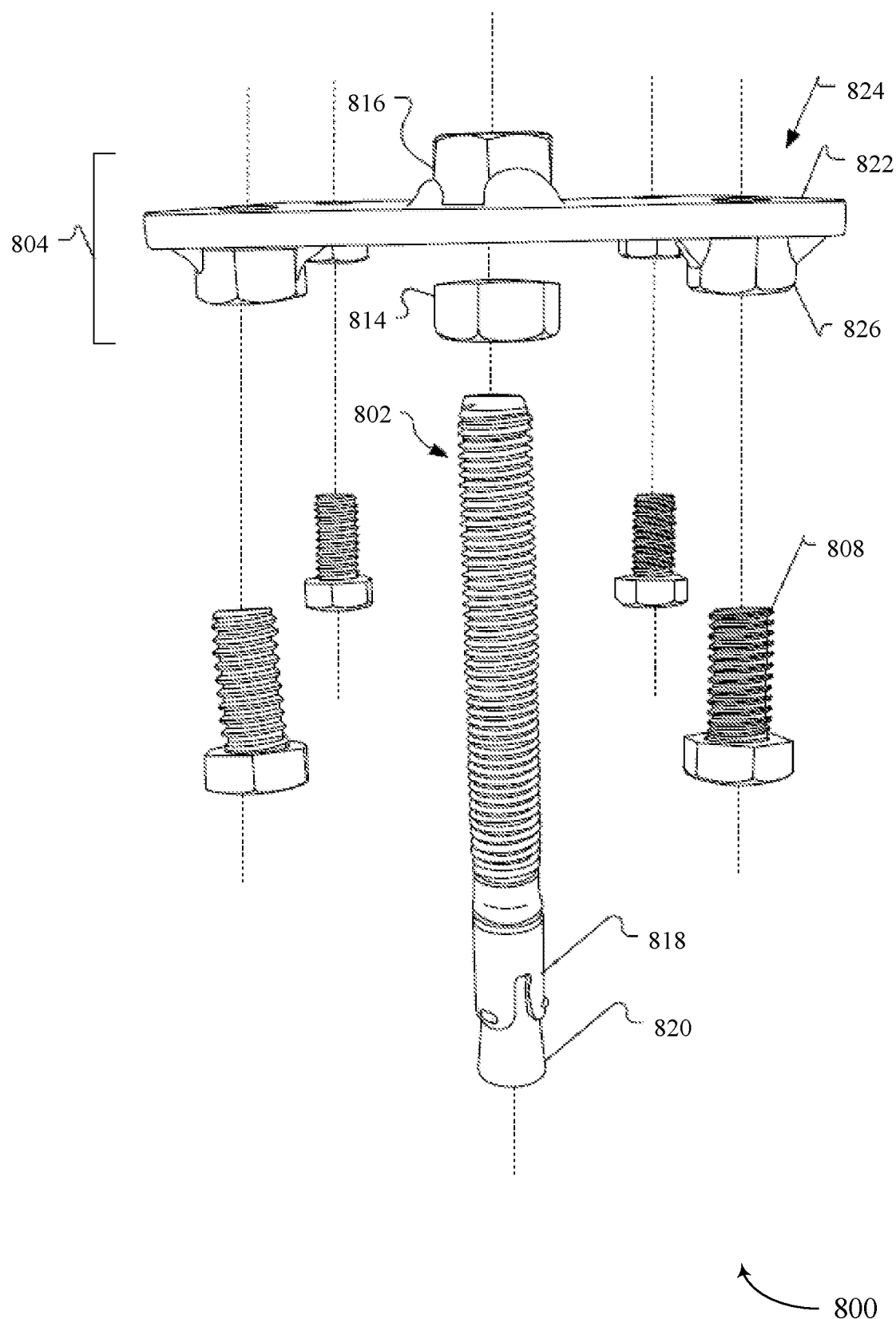
FIG. 8 illustrates a side exploded view of an example post installation bracket.

FIG. 8 illustrates a side exploded view of a post installation bracket 800. The post installation bracket 800 includes an anchoring bolt 802 and a leveling assembly 804. The anchoring bolt 802 is installed in a concrete slab (not shown) and is securely attached to a leveling plate 822 using anchoring nuts 814 and 816.

The leveling assembly 804 includes leveling elements (e.g., a leveling element 824). In the illustrated implementation, the leveling elements include a leveling bolt and a nut. For example, the leveling element 824 includes the leveling bolt 808 and a nut 826. The nut 826 is securely welded or otherwise attached to the leveling plate 822. In some example implementations, a threaded column, hole, channel, etc. is formed as a part of the leveling plate 822 and is configured to securely receive the leveling bolts (such as the leveling bolt 808). The leveling bolts (e.g., the leveling bolt 808) are utilized to level and position the post after the post is installed on the anchoring bolt 802.

Figure 9:
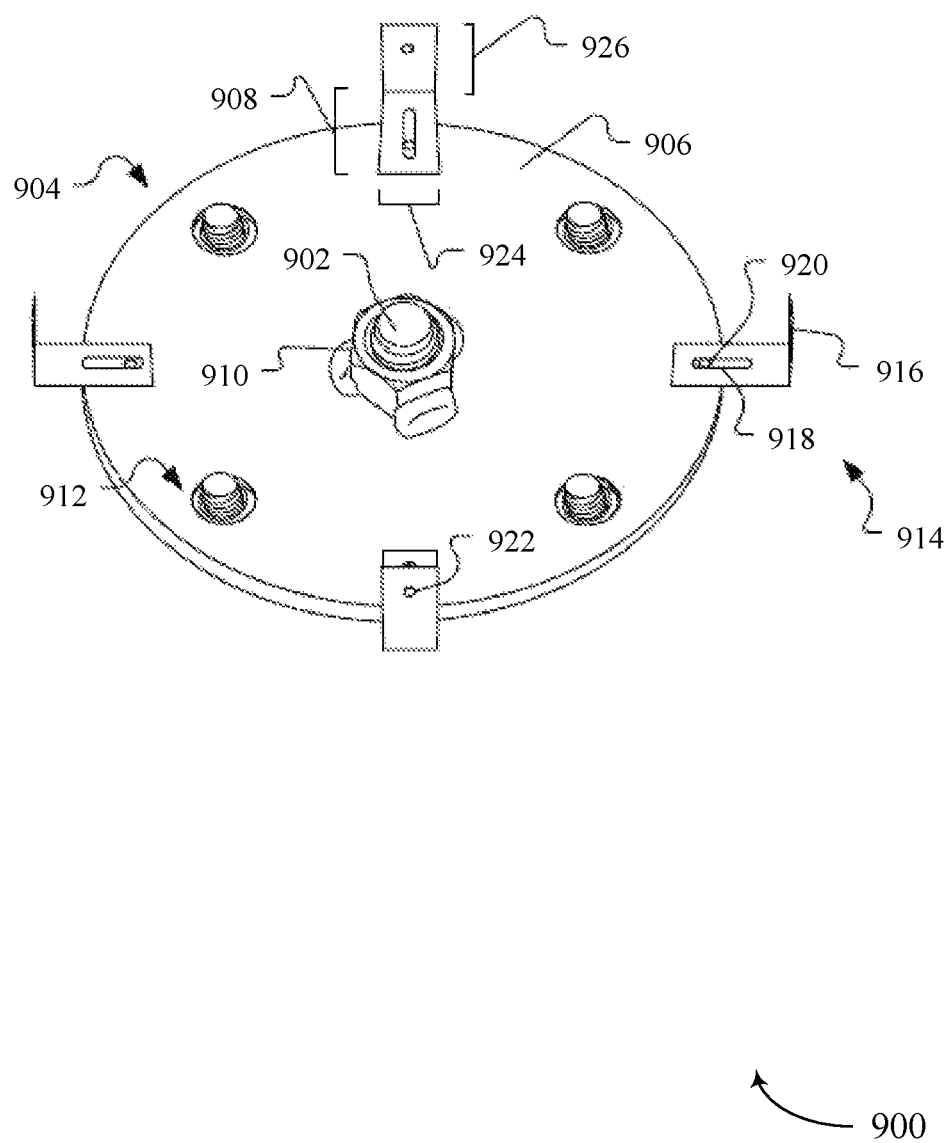
FIG. 9 illustrates an elevated perspective view of an example post installation bracket 1000.

FIG. 9 illustrates an elevated perspective view of an example post installation bracket 900. The post installation bracket 900 includes an anchoring bolt 902 and a leveling assembly 904. The leveling assembly 904 includes a leveling plate 906, an anchoring nut 910, and a number of leveling elements (e.g., leveling element 912). In FIG. 9, the leveling plate 906 is a circular shaped and may be used for a cylindrical post, but it should be understood that the leveling plate 906 may be configured in a number of different shapes. The anchoring nut 910 is securely attached to the leveling plate 906. In the illustrated implementation, the anchoring nut 910 is welded to the leveling plate 906, but it should be understood that other configurations are contemplated. For example, an anchoring bolt channel may be machined as a part of the leveling plate and configured to securely receive the anchoring bolt 902.

The leveling assembly 904 is fastened to a post (not shown) using bracket assemblies (e.g., a bracket assembly 914). For example, the bracket assembly 914 includes an L-bracket 916 with an adjustment slot 918 in a lower portion of the L-bracket 916. The leveling plate 906 includes pilot holes (e.g., a pilot hole 920) for fastening the L-brackets to the leveling plate 906 (e.g., using a fastener such as a bolt or screw). For example, the L-bracket may be attached to the leveling plate 906 using a ⅜-inch bolt and a corresponding nut. The top portion of the L-bracket includes a pilot hole (e.g., a pilot hole 922) for connecting the L-bracket and the leveling assembly 904 to a side of a post or column. The adjustment slots allow the L-brackets to be slidably adjusted to receive varying diameters or widths of columns and posts.

The L-brackets may be formed of 16 to 18 gauge galvanized steel, but other thicknesses may be utilized. In some example implementations, the L-brackets have a height 926 of 1 inch, a length 908 of 2 inches, and a width 924 of 1½ inches. However, it should be understood that other dimensions may be used. Furthermore, the L-bracket implementation may be utilized with a square shaped column installation bracket (such as illustrated in FIG. 1).

The post installation bracket 900 illustrated in FIG. 9 may be used for attaching, securing, and leveling fiberglass columns or columns constructed from varying materials such as wood, plastic, concrete, fiber-reinforced plastic, polymers, polymer matrix composites, other composites thereof, etc. Such prefabricated columns may include hollow interiors, which may require utilization of the L-brackets for attaching the leveling assembly 904 to the column. Such columns may further include decorative or non-decorative bases that cover the attaching and leveling assemblies. The post installation bracket 900 (as well as other described implementations) are configured for use with such bases.

The logical operations making up the embodiments of the invention described herein may be performed in any order, adding or omitting operations as desired, unless explicitly claimed otherwise or a specific order is inherently necessitated by the claim language.

The above specification, examples, and data provide a complete description of the structure and use of exemplary embodiments of the invention. Since many embodiments of the invention can be made without departing from the spirit and scope of the invention, the invention resides in the claims hereinafter appended. Furthermore, structural features of the different embodiments may be combined in yet another embodiment without departing from the recited claims.

What is claimed is:

1. A post installation bracket comprising:
    a leveling plate including at least one leveling element positioned at a respective non-central location of the leveling plate, an anchoring bolt securing assembly that is fastened at a central location of the leveling plate and configured to receive a first end of an anchoring bolt with a second end that is anchored in a footing, and at least one pilot hole for securing the leveling plate to a base of a post; and
    at least one leveling bolt securely fastened to the at least one leveling element, the at least one leveling bolt used to position the leveling plate with respect to the footing while the base of the post is positioned on the leveling plate, wherein the at least one leveling bolt is accessible between an upper surface of the footing and a lower surface of the leveling plate to position the leveling plate with respect to the footing.

2. The post installation bracket of claim 1, wherein the at least one leveling bolt provides upward force to the base of the post to secure the post.

3. The post installation bracket of claim 1, wherein the anchoring bolt securing assembly includes threads for engaging with the anchoring bolt.

4. The post installation bracket of claim 1, wherein the anchoring bolt securing assembly includes a nut attached to an upper surface of the leveling plate.

5. The post installation bracket of claim 1, wherein the anchoring bolt securing assembly and the leveling plate includes an opening configured to allow the first end of the anchoring bolt to traverse the leveling plate and enter the base of the post.

6. The post installation bracket of claim 1, wherein the post is a cylindrical post.

7. The post installation bracket of claim 1, further comprising:

one or more bracket assemblies attached to the leveling plate, the one or more bracket assemblies configured to attach the leveling plate to the post.

8. The post installation bracket of claim 7, wherein the post is a hollow post.

9. A post comprising:
a first end and a second end;
a leveling plate attached to the first end, the leveling plate including at least one leveling element and an anchoring bolt securing assembly configured to receive a first end of an anchoring bolt; and
at least one leveling bolt securely fastened to each of the at least one leveling element, the at least one leveling bolt configured to position the leveling plate with respect to a footing while the leveling plate is securely attached to a base of the post using fasteners, wherein the leveling plate includes a first pilot hole for receiving the anchoring bolt, a second set of pilot holes for receiving the fasteners for securing the leveling plate to the base of the post, and a third set of pilot holes for receiving a respective leveling bolt of the at least one leveling bolt, and wherein the first pilot hole, the second set of pilot holes, and the third set of pilot holes are different.

10. The post of claim 9, wherein the at least one leveling bolt provides upward force to the base of the post to secure the post.

11. The post of claim 9, wherein the anchoring bolt securing assembly includes threads for engaging with the anchoring bolt.

12. The post of claim 9, wherein the anchoring bolt securing assembly includes a nut securely attached to an upper surface of the leveling plate.

13. The post of claim 12, wherein the post is a cylindrical post.

14. The post of claim 12, further comprising:
one or more bracket assemblies attached to the leveling plate, the one or more bracket assemblies configured to attach the leveling plate to one or more sidewalls of the post, wherein the post is a hollow post.

15. A method comprising:
attaching a leveling plate to an end of a post, the leveling plate including at least one leveling element and an anchoring bolt securing assembly;
positioning the post on an anchoring bolt such that the anchoring bolt securing assembly receives the anchoring bolt;
rotating the post until the at least one leveling element contacts a surface of a footing; and
rotating a leveling bolt of the at least one leveling element until the post is in a desired position, wherein the leveling bolt is accessible between an upper surface of the footing and a lower surface of the leveling plate to position the leveling plate with respect to the footing.

16. The method of claim 15, wherein rotating the leveling bolt of the at least one leveling element further provides upward force to the post to secure the post against lateral forces applied to the post.

17. The method of claim 15, wherein attaching the leveling plate to the end of the post further comprises:
inserting one or more fasteners through one or more pilot holes of the leveling plate, the one or more fasteners securing the leveling plate to the end of the post.

18. The method of claim 15, wherein attaching the leveling plate to the end of the post further comprises:
inserting fasteners through one or more bracket assemblies configured to attach the leveling plate to one or more sidewalls of the post.

* * * * *